United States Patent [19]

Nicod

[11] Patent Number: 4,762,369
[45] Date of Patent: Aug. 9, 1988

[54] HARNESS WITH STRAP LENGTH ADJUSTMENT DEVICE

[75] Inventor: Frederick C. Nicod, Cumbria, England

[73] Assignee: ASE (UK) Limited, Cumbria, England

[21] Appl. No.: 13,216

[22] Filed: Feb. 5, 1987

[30] Foreign Application Priority Data

Feb. 5, 1986 [GB] United Kingdom ............... 8602874
Mar. 25, 1986 [GB] United Kingdom ............... 8607346

[51] Int. Cl.$^4$ ..................... A47D 15/00; B60R 21/00
[52] U.S. Cl. .................................. 297/484; 280/808; 297/216; 297/464
[58] Field of Search .............. 297/467, 483, 484, 250, 297/216, 464, 468, 474, 488; 280/801, 808

[56] References Cited

U.S. PATENT DOCUMENTS 4,342,483  8/1982  Takada ......................... 297/250 X
4,660,889  4/1987  Anthony et al. ................. 297/467

FOREIGN PATENT DOCUMENTS 2522285  12/1975  Fed. Rep. of Germany ...... 297/467
2929362   1/1981  Fed. Rep. of Germany ...... 297/474

Primary Examiner—James T. McCall
Attorney, Agent, or Firm—Young & Thompson

[57] ABSTRACT

In a safety harness, a strap length adjustment device (10) has an adjustment member (20) selectively movable generally longitudinally of the strap (9), the strap preferably extending around the member so that twice the length of strap is protracted or retracted per unit movement of the member. The adjustment member (20) may be held in a selected position against a spring (29) tending to retract the strap by spring-biassed caliper jaws (30) released by a push button (37). The device (10) may be embodied as an abdominal pad in a child's harness for use or incorporated in a push chair or a vehicle safety seat.

18 Claims, 1 Drawing Sheet

HARNESS WITH STRAP LENGTH ADJUSTMENT DEVICE

FIELD OF THE INVENTION

The invention relates to a harness, such as may be used for restraint of a child in a push chair, a high chair or a vehicle seat, incorporating a device for adjusting the length of at least one elongate element of the harness, for example, a strap or length of webbing.

BACKGROUND OF THE INVENTION

Safety harnesses are typically provided with adjustment means so that they can correctly fit occupants of different sizes and where an adult has to fit the harness onto a child it is important that the adjustment means are convenient to operate. The adjustment means desirably also disposes of unwanted end portions of the straps or webbing in a tidy and convenient way.

It is accordingly an object of the invention to provide a device for connecting together elements of a harness, the device including conveniently operable means for selective adjustment of the effective length of at least one of the harness elements.

It is also an object of the invention to provide a safety harness belt length adjustment device in which a substantial change of belt length is obtained by a smaller control movement.

It is a further object of the invention to provide a belt length adjustment device in which the unused belt length is retained therein.

It is also an object of the invention to provide a harness adjustment device biassed to retract an elongate harness element therein and adapted to be releasably latched with a desired length of the element protruding therefrom.

SUMMARY OF THE INVENTION

The invention accordingly provides an adjustment device for an elongate element, for example, a strap or length of webbing in a harness, in which an adjustment member is movable generally in the direction in which the elongate member extends. The invention also provides an adjustment device for such an element, in which movement of an adjustment member effects protection or retraction of a greater length of the element.

The device can provide a securement position for the element from which the element extends around the movable member and outwardly of the device, the member being movable relative to the securement position to alter the outwardly extending length of the element, so that a given movement of the member results in a protraction of twice the length of the element from the device, or the equivalent retraction into it. The movable member can however be constituted so that a given movement of the movable member results in the protraction on retraction of more than double the length of the element.

The adjustment device can accordingly be quite compact, and can be arranged to contain within it the unused length of the elongate element, so this length can be effectively hidden from view if the device is provided with a housing or enclosed within a cover. The movable member can have entrained around it more than one elongate element, so that, for example, two shoulder straps of a conventional symmetrical harness can be adjusted together.

The device includes means for releasably retaining the member in the selected position corresponding to a desired protruding length of the elongate element and the member can be spring biassed to move towards one of its end positions. The member can thus be biassed to oppose protraction of the elongate element so that when the member is released, retraction of the elongate element follows. In many instances, the free outer end of the elongate element will be connected to an article, for example, a child's vehicle seat or push chair, with which the device is associated, so that movement of the device as a whole away from the position of connection, with the member released, will effect protraction of the elongate element.

The movable member may be constituted by a slide member which can be releasably retained in a selected one of a plurality of preset positions, or at any selected position within a preset range. The movable member can be releasably retained in the desired position by any suitable detent or latch mechanism, by conveniently one which is biassed to the latched position. Thus a suitable detent mechanism comprises a spring biassed caliper type mechanism of which the caliper arms require to be held apart against the spring bias to permit the adjustment movement of the frame and the roller bar it carries.

For use with a child's car seat, the adjustment device is conveniently embodied as a torso or abdominal pad which functions to spread over a substantial area the load of the harness experienced by the occupant in an emergency deceleration of the vehicle. The harness then conveniently comprises a shoulder belt portion extending downwardly to the abdominal pad from the upper region of the back of the seat with which it is used or in which it is incorporated, and a central lower portion connecting the pad to a lower anchorage, for example, the lower front edge of the seat. The central harness portion may be a strap or other elongate member the effective length of which is adjustable by the adjustment device of the invention, either jointly with the shoulder belt portion or independently, by a second such device.

BRIEF DESCRIPTION OF THE DRAWINGS

The invention is further described below, by way of example, with reference to the accompanying drawing, in which.

Figures 1, 2, 3:
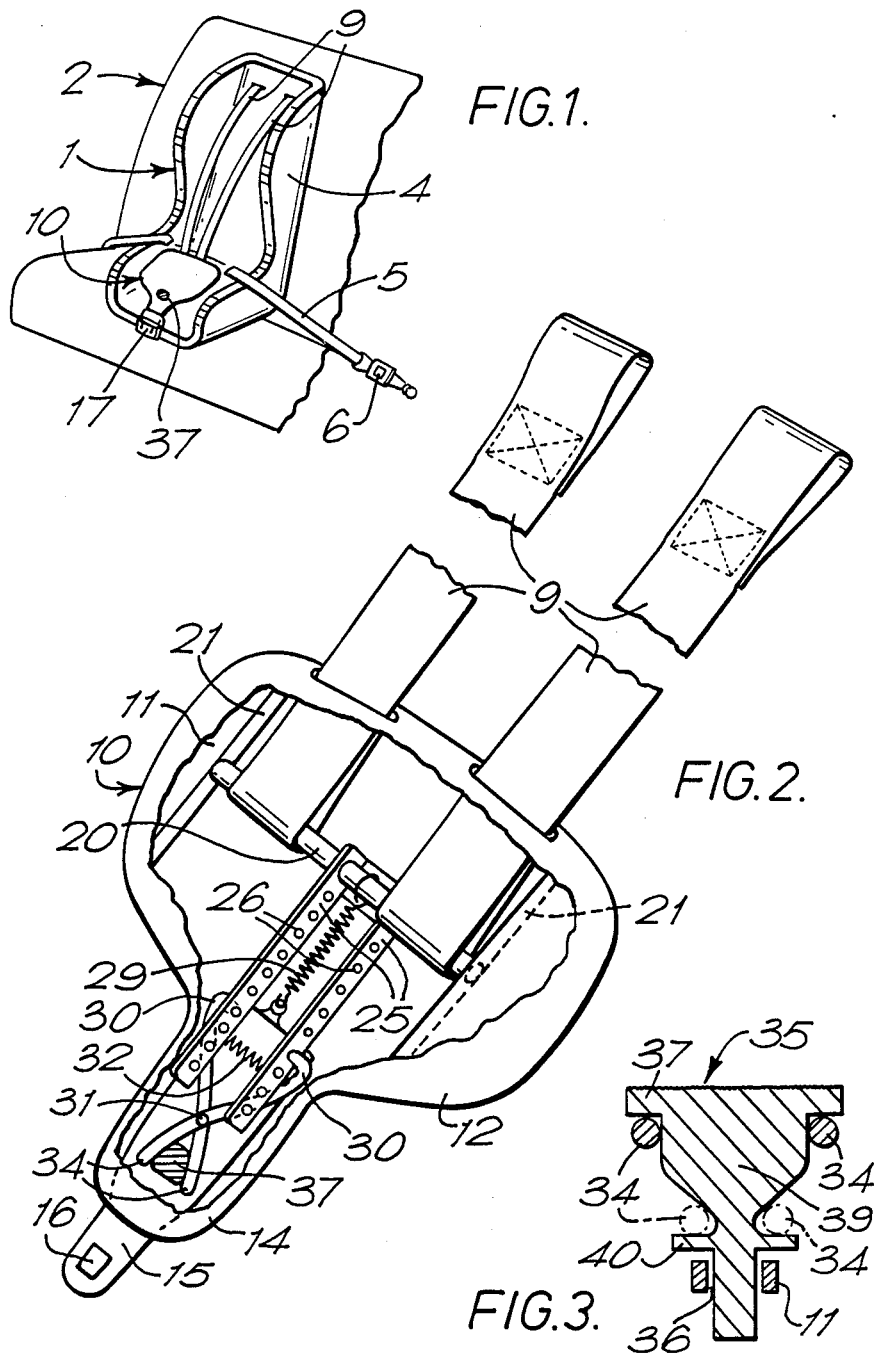
FIG. 1 is a perspective view from the front of a child's seat having a harness including an adjustment device in the form of an abdominal device in accordance with the invention, the child's seat being installed on a road vehicle seat.
FIG. 2 is a perspective view on a larger scale of the adjustment device included in the harness of FIG. 1, with parts broken away to show the interior.
FIG. 3 is a fragmentary view of a latch release mechanism included in the adjustment device.

The child's seat 1 shown in FIG. 1 installed on the rear seat 2 of a passenger motor vehicle comprises a lined and padded plastics shell 4 secured in place by a conventional lap belt 5 extending between suitable anchorages, such as anchorage 6, to the vehicle body. The shell 4 mounts a harness comprising a pair of shoulder belts 9 extending forwardly and downwardly from the backrest portion of the shell to a connector or adjustment device to constituted as an abdominal pad better shown in FIGS. 2 and 3.

The device 10 is of hollow construction and comprises a frame 11 provided, for the comfort of the user, with an outer cover 12 of suitable fabric or sheet plastics material backed by padding for example a plastics foam padding. The frame 11 is of generally uniform thickness and of generally rectangular shape with an integral connecting portion 14 extending from the longer side which is lowermost in use. A metal plate 15 extends outwardly from the free end of the connection portion 14, its exposed end being apertured at 16 to provide a latch formation which is releasably received in use in a socket member 17 secured centrally to the front edge of the shell 4.

The upper side of the device 10 has two aligned elongate apertures through which extend two elongate harness elements or shoulder belts 9. The free lower end of each belt 9 is secured to the frame 11 at its upper side and extends downwardly from the securement position to a movable member of the device which comprises a transverse roller bar 20 guided for movement perpendicular to its length, by spaced parallel guide slots 21 in the frame, which receive the ends of the roller bar.

Between the belts 9, the roller bar 20 is connected to two spaced parallel side elements 25 of the movable member, which elements are apertured at the upper ends to receive the bar. The side elements 25 extend away from the belts 9 in the direction of the slots 21 and each has a row of detent apertures or recesses 26 extending along it. A tension spring 29 acts between the plate 15 and the roller bar 20 to retract the latter into the device, so shortening the lengths of the belts 9 outside the device.

The frame 11 also mounts a detent or latch means by which the roller bar 20 is held in a desired position. The detent means comprises a pair of caliper jaws 30 of which the free ends can be received in the side element recesses 26. The jaws 30 are pivotally mounted on the frame 11 at a pivot axis 31 and a tension spring 32 urges them together to engage the side members. The jaws 30 have release portions 34 extending downwardly beyond the pivot axis 31 to a release mechanism for manual operation to withdraw the jaws from the side element recesses 26.

The release mechanism comprises a button member 35 guided in an aperture 36 in the frame 11 for movement parallel to the pivot axis 31. From an outer flange portion 37, the outer surface of which is exposed at the surface of the device 10 for depression manually by the user, the member 35 tapers inwardly through a wedge-shaped or frusto-conical portion 39 to a flange 40. In the depressed position of the button member 35, shown in FIG. 3, the release portions 34 are forced apart against the pull of the spring 32 and rest underneath the flange portion 37. As long as the button member is held depressed in this way, the shoulder belts 9 can be pulled out, or allowed to be retracted, to a desired length against, or by, the pull of the spring 29. The roller bar 20 moves upwardly or downwardly through a distance equal to half the length of the belt protraction or retraction.

On release of the button member 35, the spring 32 tends to bring the release portions 34 together, so that these move over the button member portion 39 forcing the button member outwardly, until the release portions engage against the flange 40, as shown in broken line in FIG. 3. At this time, the caliper jaws 30 have engaged in the recesses 26 against their ends, so the roller bar 20 is latched against movement until the button member 35 is again depressed.

In use, therefore, a child is placed in the seat 1 and the harness placed about him by insertion of the free end of the plate 15 into the socket member 17. Any necessary adjustment of the length of the shoulder belts 9 is then effected during depression of the button member 25 as described above.

Although described and illustrated in the context of a child's seat for use in a road vehicle, it will be evident that the connector or adjustment device 10 can be used in a harness similar to that illustrated but in a push chair or the like, or in a harness, whether in a push chair or the like or a vehicle seat, of different configuration from that illustrated, with appropriate modification.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A safety harness comprising shoulder straps, a lower securement means, and a connector device establishing connection between said shoulder straps and said lower securement means, said connector device comprising:

a frame, means securing ends of said shoulder straps to said frame, apertures adjacent said securing means for said shoulder straps to extend therethrough outwardly of said connector device, bar means extending transversely of said shoulder straps, guide slots in said frame guiding said bar means for movement towards and away from said securing means and said apertures, and holding means holding said bar means at a selected position along said guide slots, said holding means comprising a manually operable detent means pivotably mounted on said frame, a detent member carried by said bar means, detent formations on said detent member, and a spring releasably biasing said manually operable detent means into engagement with one of said formations, said shoulder straps extending frame said securing means to said apertures around said bar means, whereby the selected position of said bar means determines the length of said shoulder straps retained within said connector device.

2. The safety harness of claim 1 wherein said detent means is carried by said bar means between said shoulder straps and extends away from said securing means and said apertures towards said lower securement means.

3. The safety harness of claim 1 wherein said detent means is manually operable in the region of said connector device adjacent said lower securement means.

4. The safety harness of claim 1 wherein said manually operable detent means comprises a pair of caliper jaws having free ends urged together by said spring to engage said detent formations.

5. The safety harness of claim 4 wherein said pair of caliper jaws have release portions movable apart to disengage said free ends from said detent formations, and further comprising push button means manually operable to move apart said caliper jaw release portions.

6. The safety harness of claim 1 further comprising an integral portion of said frame adapted for releasable connection with said lower securement means.

7. The safety harness of claim 1 further comprising spring means biassing said bar means away from said securing means and said apertures.

8. The safety harness of claim 1 further comprising padding material externally of said frame, and wherein said connector is located in said harness to function as a torso or abdominal pad.

9. A safety harness for restraining the occupant of a seat having a seat portion and a backrest portion, said harness comprising:
 a connector device,
 connector means connecting said connector device to said seat portion at the front region thereof,
 at least one shoulder strap,
 securement means for securing said at least one shoulder strap for the strap to extend downwardly to said connector device,
 biassing means in said connector device acting on said shoulder strap so as to draw said shoulder strap into said device,
 holding means operable to hold said biassing means in a position corresponding to the extension of a predetermined length of said shoulder strap from said connector device, and
 release means manually operable externally of said connector device to release said holding means to permit withdrawal against said biassing means of a desired length of said shoulder strap.

10. The safety harness of claim 9 wherein said biassing means comprises a member engaged with said shoulder strap and a first spring acting on said member, and wherein said holding means comprises detent means releasably engageable with said member and a second spring urging said detent means to engage said member.

11. The safety harness of claim 10 wherein said release means comprises a button element having a portion exposed externally of said connector device for manual operation to withdraw said detent means from said member.

12. The safety harness of claim 9 wherein said biassing means comprises a bar extending transversely of said shoulder strap and about which said shoulder strap reverses direction, whereby movement of said transverse bar lengthwise of the shoulder strap through a certain distance moves twice the length of said shoulder belt.

13. The safety harness of claim 9 wherein said connector means comprises a latch element protruding from said connector device and a socket centrally located at the front of said seat portion, said latch element being releasably receivable in said socket.

14. The safety harness of claim 13 wherein said connector device further comprises a frame mounting said biassing means, said holding means and said release means, a portion of said frame constituting said latch element.

15. A safety harness for restraining the occupant of a seat having a seat portion and a backrest portion, said harness comprising:
 a connector device,
 connector means connecting said connector device to said seat portion at the front region thereof,
 shoulder strap means,
 securement means securing said shoulder strap means so as to extend downwardly to within said connector device,
 and adjustment member carried by said connector device for selective movement generally lengthwise of said shoulder strap means in the vicinity of said device, said adjustment member being engaged with said shoulder strap means so that said movement of said adjustment member over a selected length effects protraction from or retraction into said device of a greater length of said shoulder strap means.

16. The safety harness of claim 15 wherein said adjustment member is engaged with said shoulder strap means in a manner whereby a movement of said adjustment member over a unit distance effects protraction from or retraction into said connector device of two unit lengths of said shoulder strap means.

17. The safety harness of claim 15 further comprising spring means biassing said adjustment member in a direction to retract said shoulder strap means into said connector device.

18. The safety harness of claim 17 further comprising manually releasable detent means engageable with adjustment member to hold said adjustment member in a desired position thereof against the bias of said spring means.

* * * * *